UNITED STATES PATENT OFFICE.

OLIVER B. EVANS, OF TITUSVILLE, PENNSYLVANIA.

IMPROVEMENT IN PHOTOGRAPHIC PLATES.

Specification forming part of Letters Patent No. 166,922, dated August 24, 1875; application filed January 2, 1875.

*To all whom it may concern:*

Be it known that I, OLIVER B. EVANS, of Titusville, Crawford county, Pennsylvania, have invented an Improvement in Photography, of which the following is a specification:

My invention relates to an improvement in the photographic art, by a combination of chemicals, to produce a white and a flesh-tinted enamel surface, on which I print a beautiful "alabaster" photograph, as follows: I use the best ferrotype-plates, or best card-mounts, which I flow with well-prepared albumen and water, equal parts, heated well together, and filtered. It may be well to wet the plate first by brushing on the albumen, then flow the mixture over evenly, and set away to dry. The plate may then be submitted to about the same amount of heat as is used in preparing the albumen photographic paper. The surface is now ready to receive the enamel solution, prepared as follows: Flake white, one ounce; pearl white, one-fourth ounce; oxide of zinc, one-half ounce. Color with any pink or flesh tint that is soluble in water or alcohol; then put all except the color in a porcelain mortar, and pulverize well. I then put the powder into a large-mouth long bottle, and add plain collodion until, when shaken well together, it will be about as thick as common cream; then cork tight. This is my stock enamel solution. When wanted for use, I decant into a small bottle, suitable for pouring, and add plain collodion, and shake until it is the right thickness to flow evenly over the plate. I then add the color, drop by drop, until the tint is what is desired. A few experiments may be necessary for any one to ascertain how thick the solution should be to flow evenly.

Always keep the bottles well corked to prevent evaporation. Always shake both bottles a few minutes before using; and when either becomes too thick dilute with the plain collodion, or alcohol and ether, equal parts.

To prepare for printing, I pour from the working bottle over the albumenized plate or card-mount in the same manner as the operator does on glass for negatives, only I do not dip the plate quite as much, but keep the plate as near level as possible, and have the enamel run to one corner into the bottle. Manage as near as possible to pour on only sufficient to fairly cover the plate. Great care must be taken to have the enamel even on the plate. If the first coating is not sufficient, allow the enamel to fairly set, reverse the plate, and flow a second time. After the enamel is set, place the plate in a tray of soft water, and let remain until all the oily appearance disappears. I then flow over the plate the albumen sizing, and dry with a gentle heat, if in a hurry; if not, stand the plate in a rack out of the dust until dry and hard. The plate is now ready to print. Use any good porcelain collodion, and treat every way as in printing on paper, except do not use the gold and fixing baths quite as strong. I over-print, as on paper. After the print is fixed, wash under the tap five minutes, dry, and varnish with best white ambrotype-varnish.

I have given a description of chemicals used in my combination, and their proportions, but would like to be understood they may be varied according to circumstances, and do not confine myself to them precisely as stated.

What I claim as new, and desire to secure by Letters Patent, is—

A photographic printing-surface, consisting essentially of flake white, pearl powder, oxide of zinc, and collodion, combined in about the proportions, and prepared in the manner, substantially as hereinbefore described.

In testimony that I claim the above I have hereunto subscribed my name in the presence of two witnesses.

OLIVER B. EVANS.

Witnesses:
 DAVID A. RAY,
 HIRAM S. PERRY.